March 3, 1964  D. J. JONES  3,122,856
TRAP
Filed March 6, 1962  2 Sheets-Sheet 2
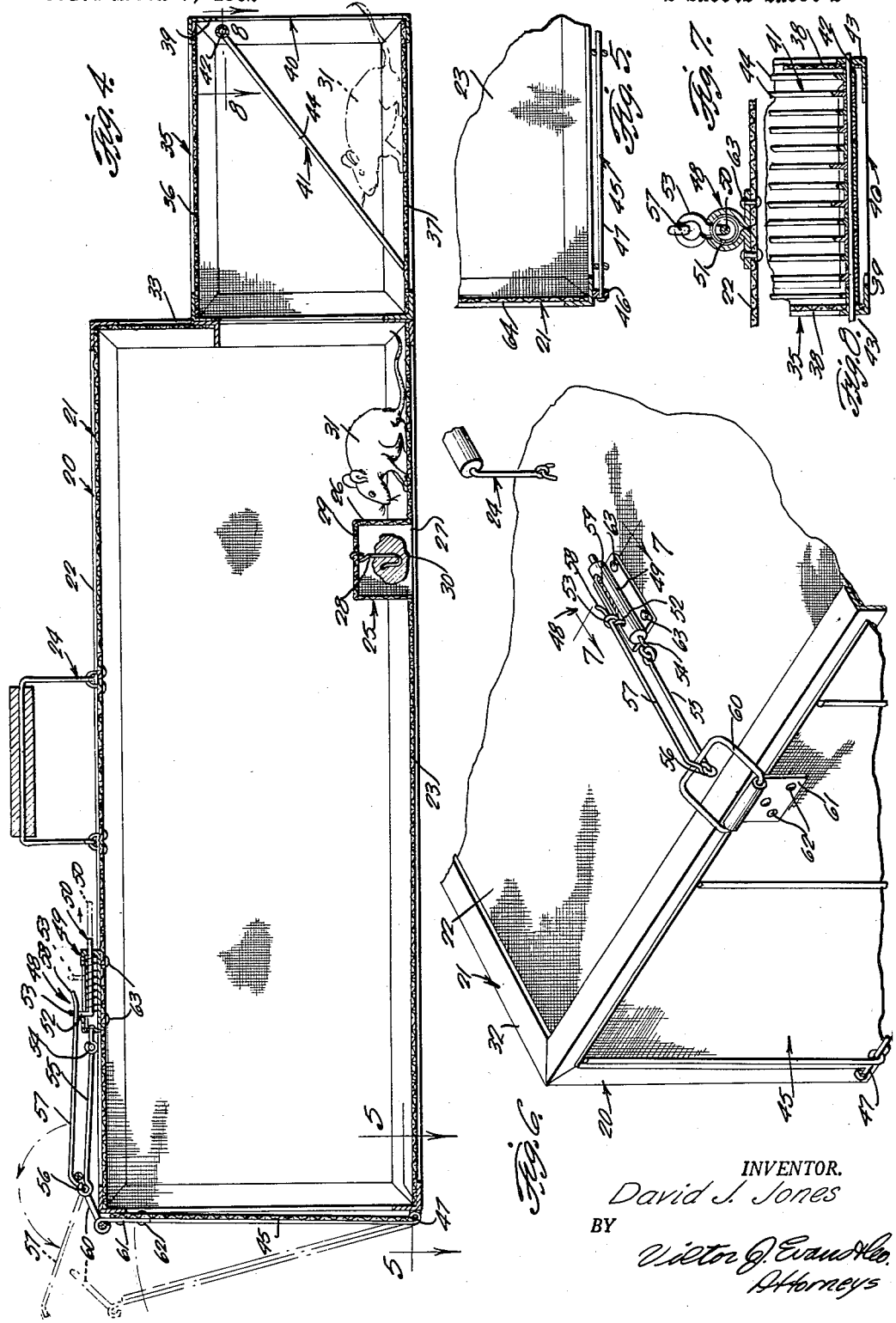
INVENTOR.
David J. Jones
BY
Victor J. Evans & Co.
Attorneys

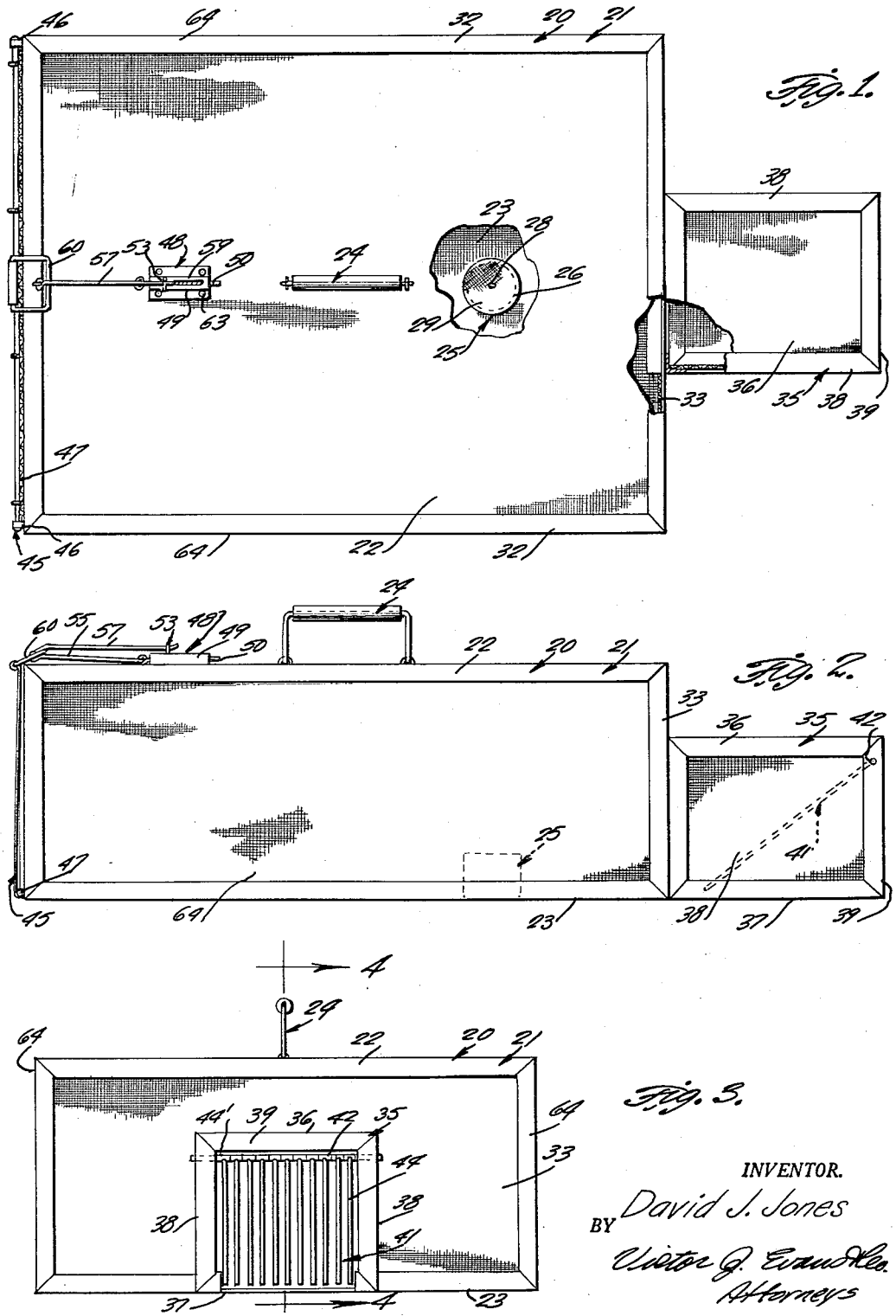

1

3,122,856
TRAP
David J. Jones, Box 94Z, Outlet R.D. 1,
Harvey's Lake, Pa.
Filed Mar. 6, 1962, Ser. No. 177,774
1 Claim. (Cl. 43—66)

The present invention relates to a trap, and more particularly to a trap for catching rodents such as rats, mice or the like.

The primary object of the present invention is to provide a trap which is provided with a bait holder and wherein the trap is constructed so that an animal such as a rodent will be attracted to the trap by the bait and wherein the trap is such that the rodent can enter the interior of the trap but cannot leave the trap after once entering except when the closure is opened so as to permit emptying of the trap into a suitable area, receptacle or the like.

A further object of the present invention is to provide a trap of the type stated which includes a novel latch or lock mechanism for selectively maintaining a closure in locked position, and wherein when it is desired to open the trap as for example when rodents or the like are to be removed from the trap, the latch or lock mechanism can be manually actuated or operated so as to permit the closure to open for convenient removal of the rodents or other animals therefrom.

Still another object is to provide such a trap that is economical to manufacture and efficient in operation and which is rugged in structure and foolproof in use.

These and other objects of the invention will become apparent from a reading of the following specification and claim, together with the accompanying drawings, wherein like parts are referred to and indicated by like reference characters and wherein:

FIGURE 1 is a top plan view of the trap constructed according to the present invention, and with parts broken away and in section.

FIGURE 2 is a side elevational view.

FIGURE 3 is an end elevational view of the trap showing the entrance end.

FIGURE 4 is a sectional view taken on the line 4—4 of FIGURE 3.

FIGURE 5 is a sectional view taken on the line 5—5 of FIGURE 4.

FIGURE 6 is a fragmentary enlarged perspective view illustrating the latch mechanism for retaining the closure in locked or closed position.

FIGURE 7 is a sectional view taken on the line 7—7 of FIGURE 6.

FIGURE 8 is a sectional view taken on the line 8—8 of FIGURE 4.

Referring in detail to the drawings, the numeral 20 indicates the trap of the present invention which is shown to comprise a hollow housing 21, and the housing 21 is adapted to be made of a suitable reticulated or screened-like material and includes frame pieces as indicated by the numeral 32. The housing 21 is shaped to include horizontally disposed spaced parallel top and bottom walls 22 and 23, and the numeral 24 indicates a handle which is connected to the top wall 22, FIGURE 4.

As shown in the drawings there is provided a bait holder which is indicated generally by the numeral 25, and the bait holder 25 consists of a hollow body member 26 which is suitably affixed in the lower portion of the housing 21, and the bottom of the member 26 is open so that the bait can be inserted through the open bottom, and the open bottom is indicated by the numeral 27 in FIGURE 4. The numeral 28 indicates a hook member which depends from the top 29 of the body member 26, and the numeral 30 indicates bait which is suitably mounted on the hook member 28. In the drawings the numeral 31 indicates an animal such as a rodent which is adapted to be trapped by the present invention.

The numeral 35 indicates an entrance unit or box-like member which is arranged contiguous to the end wall 33 of the housing 21, and the end wall 33 has an opening 34 therein so that the animals can pass through such opening 34 to approach the bait 30. The entrance unit 35 includes horizontally disposed spaced parallel top and bottom walls 36 and 37 as well as spaced parallel vertically disposed side walls 38, and the entrance unit 35 further includes an end portion 39 which has an entrance opening 40 therein.

The numeral 41 indicates a gate which is mounted for movement into and out of blocking or closing relation with respect to the opening 40, and as shown in FIGURE 8 for example, the gate 41 includes a horizontally disposed pintle pin 42 which is journaled in openings 43 in the sides 38 of the entrance unit 35, and the gate 41 further includes a plurality of spaced parallel rods 44 which depend from the pin 42. Each rod 44 is swingable about the pin 42 independently of any other rod 44, there being a short sleeve 44′ fixed to the upper end of each rod 44, the sleeves 44′ being arranged in end to end relation on the pin 42.

As shown in FIGURE 4, a closure 45 is arranged at the opposite end of the housing 21 from the entrance unit 35, and the closure 45 is pivotally mounted by means of a pivot pin 47 which is journaled in apertured lugs 46 at the lower corner portion of the housing 21, FIGURE 5. The numeral 48 indicates a latch or lock mechanism for selectively retaining the closure 45 in closed position as indicated in solid lines in FIGURE 4. The latch mechanism 48 consists in a hollow support member 49 secured to the top wall 22 as at 63. A plunger 50 is movably supported in the member 49, and a coil spring 51 is arranged in the support member 49 for urging or biasing the plunger 50 in the one direction. The plunger 50 has a transverse end portion 52 in which is an eye portion 53. An eye member 54 is suitably affixed to an end of the member 49, and an arm 55 is connected to the eye member 54. The arm 55 has an eye portion 56 on one end. The portion 56 is pivotally connected to one end of a keeper 57, and the keeper 57 includes an arcuate portion 58 that is adapted to engage the eye 53 of the plunger 50.

The transverse portion 52 of the plunger 50 is mounted for reciprocatory movement through a slot 59 in the top of the support member 49. The numeral 60 indicates a bail or retainer which is swivelly connected to a bracket 61, and the bracket 61 is secured as at 62 to the closure 45.

As shown in the drawings the housing 21 includes spaced parallel vertically disposed side walls which are indicated by the numeral 64.

From the foregoing, it will be seen that there has been provided a trap which is particularly suitable or useful for catching animals such as rats, mice or the like, but it is to be understood that the trap of the present invention can be used for catching or trapping other animals besides rats.

In use, with the parts arranged as shown in the drawings, it will be seen that a suitable piece of bait 30 is adapted to be arranged on the hook member 28, and due to the provision of the open bottom 27 in the bait holder 25, the bait can be readily inserted up through the open bottom 27 and suspended on the hook member 28. The housing is adapted to be made of reticulated or screen-like material so that with the trap 20 positioned in a suitable location, the scent from the bait 30 will have a tendency to permeate through the reticulated material of the housing in order to attract animals such as the rodents 31 thereto. The only way that the animal can enter the trap to try and reach the bait 30 is through the opening 40, and normally the gate 41 is in the inclined position of FIGURE 4 so that in order for the animal 31 to approach the bait 30, it is necessary for the animal to push up on the gate 41 so as to pivot the gate 41 about a horizontal axis extending through the pin 42 and the gate 41 is adapted to be pivoted or raised upwardly in a clockwise direction, FIGURE 4 so that the gate 41 can be lifted up sufficiently by the animal 31 in order to permit the animal to pass through the entrance unit 35 and then through the opening 34 whereby the animal will be attracted to the bait 30. The bait 30 is retained within the reticulated holder 25 so that the animal cannot actually gain access to the bait 30. Also when the animal passes beyond the gate 41 in entering the trap, the gate 41 will return to its normal inclined position as shown in FIGURE 4 so that the animal in the trap cannot leave the trap since the gate 41 is in blocking position relative to the opening 40. Thus, the animal is trapped in the housing 21 in the desired manner.

When it is desired to empty the housing 21, as for example when a plurality of animals are trapped therein, the latch mechanism 48 can be released so as to permit the closure 45 to swing open, and for example the closure 45 can swing or move from the solid line position of FIGURE 4 to the broken line position of FIGURE 4 whereby the animals can be dumped into a suitable location, receptacle or the like for subsequent disposal. After the trap has been emptied, the closure 45 is again moved to closed position and the latch mechanism 48 is used for maintaining or retaining the closure 45 in closed position relative to the adjacent end of the housing 21.

The handle 24 provides a convenient means of carrying or moving the trap from place to place as desired or required.

With further reference to the latch mechanism 48, it will be seen that when the closure 45 is in closed position, and with the parts in a position such as that shown in FIGURE 6 for example, the latch mechanism 48 will serve to maintain the closure 45 in closed relation with respect to the end of the housing 21. The latch mechanism 48 includes the hollow support member 49 which has the plunger 50 reciprocally arranged therein, and the spring member 51 serves to bias or urge the plunger 50 in the proper direction so that the arm 57 can be selectively retained in the eye portion 53 of the plunger 50. With the arm 57 in the solid line position of FIGURE 4, the bracket or bail 60 will be retained or held by the members 55 and 57 in order to maintain the closure 45 in the desired locked position. To release the closure it is only necessary to manually move the plunger 50, as for example from the solid line position of FIGURE 4 to the dotted line position of FIGURE 4, and this manual movement of the plunger 50 can be readily accomplished by applying finger pressure to the eye portion 53 so as to shift the eye portion 53 from left to right in FIGURE 4 whereby the eye portion 53 will clear the end portions 58 of the keeper 57 so as to permit the keeper 57 to be pivoted or swung in a counter-clockwise direction, FIGURE 4, whereby the retainer 60 can move free or clear of the keeper 57 and arm 55, and the closure 45 can then be opened to permit convenient emptying of the trap. The keeper 57 can pivot or swing relative to the arm 55 due to the provision of the pivot connection 56.

The parts can be made of any suitable material and in different shapes or sizes.

An important feature or aspect of the present invention is the locking or latching mechanism for detachably securing the end wall or closure of the trap as shown in the drawings, and wherein this arrangement permits the captured animal to readily be removed when desired or required. Also, the entrance portion of the trap is of novel and advantageous construction. As shown in the drawings the closure 45 is hingedly connected to the lower rear portion of the trap.

Although the invention herein described is fully capable of achieving the objects and providing the advantages hereinbefore mentioned, it is to be understood that it is merely illustrative of the presently preferred embodiment of the invention and that it is not to be limited to the details of construction herein described other than as defined in the appended claim.

What is claimed is:

A trap comprising a hollow housing including spaced parallel horizontally disposed top and bottom walls and spaced parallel vertically disposed side walls, a bait holder arranged in the lower portion of the housing and said bait holder comprising a hollow body member having an open bottom, a hook arranged in said body member for supporting bait thereon, said housing further including an end wall having an opening therein, a hollow entrance unit arranged contiguous to said opening and affixed to said end wall, said entrance unit comprising horizontally disposed spaced parallel top and bottom walls and spaced parallel vertically disposed side walls, there being an entrance opening in an end of said entrance unit, a swingable gate mounted for movement into and out of blocking relation with respect to said entrance opening, a closure hingedly connected to the opposite end of the housing from the entrance unit, said housing being made substantially of reticulated material, said gate comprising a horizontally disposed pintle pivotally connected to the upper side portions of the entrance unit, a plurality of spaced parallel rods depending from said pintle and each of said rods being independently pivoted on said pintle; a pair of spaced parallel apertured lugs affixed to the lower corner portion of the housing, a pivot pin journaled in said apertured lugs and connected to the lower portion of the closure, and latch means for said closure comprising a hollow support member affixed to the top wall of the housing, a plunger reciprocally arranged in said support member, a coil spring positioned in said support member and engaging said plunger, said plunger including a transverse portion having an eye, an eye member affixed to an end of the support member, an arm connected to said eye member, a keeper hingedly connected to said arm for selectively engaging the eye portion of the plunger, and a retaining bracket connected to said closure for engagement with the connection between the keeper and arm.

References Cited in the file of this patent

UNITED STATES PATENTS

| 1,151,041 | Reefe | Aug. 24, 1915 |
| 1,222,406 | Jakab | Apr. 10, 1917 |
| 1,379,326 | Worcester | May 24, 1921 |

FOREIGN PATENTS

| 5,906 | Great Britain | Mar. 9, 1910 |